United States Patent Office 3,330,954
Patented July 11, 1967

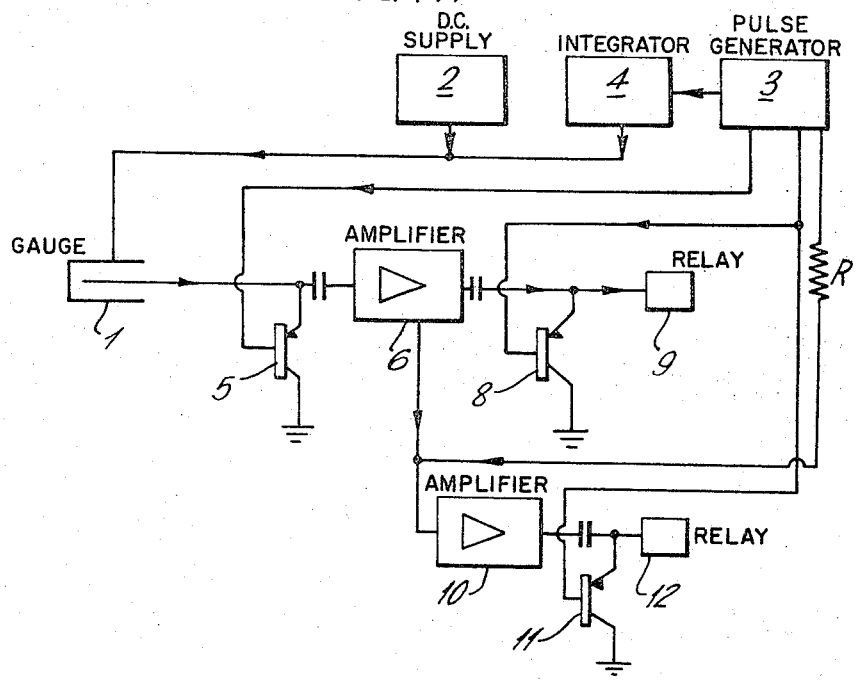
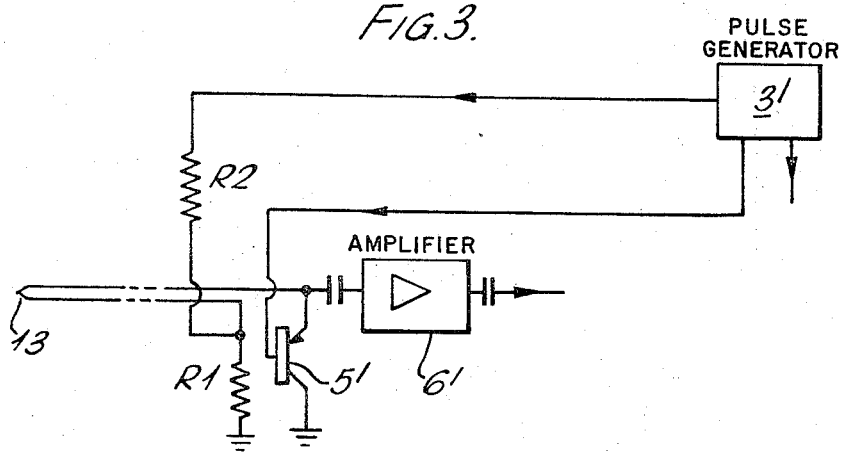

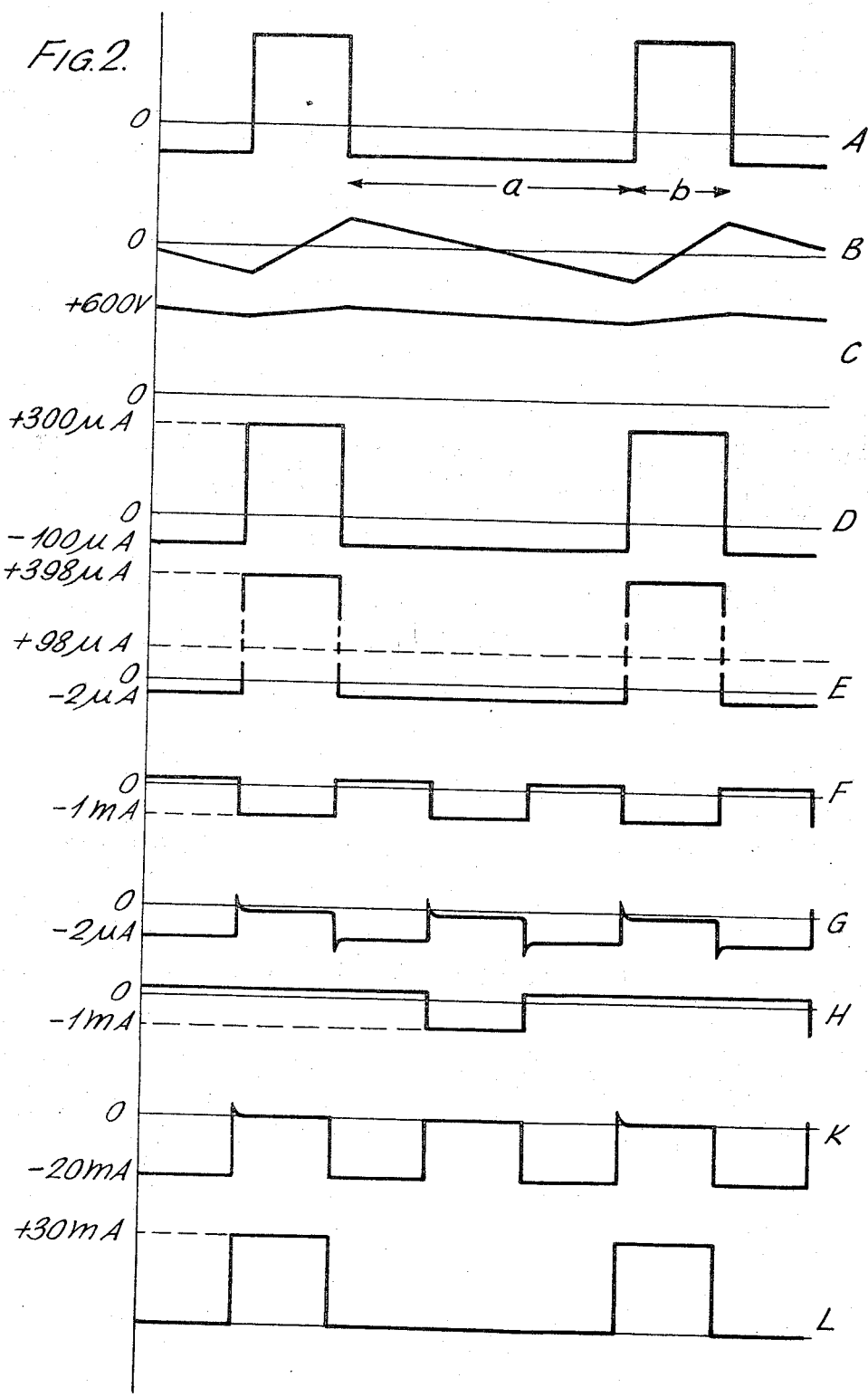

3,330,954
NEUTRON FLUX MONITOR HAVING MEANS TO COMPARE A D.C. SIGNAL WITH AN A.C. SIGNAL AND AMPLIFY THE DIFFERENCE
Raymond John Cox, Broadstone, Eliot Patrick Fowler, Dorchester, and Donald Harrison, Broadstone, England, assignors to United Kingdom Atomic Energy Authority, London, England
Filed Aug. 3, 1964, Ser. No. 386,961
Claims priority, application Great Britain, Aug. 15, 1963, 32,389/63
9 Claims. (Cl. 250—83.6)

This invention relates to amplifying systems involving the comparison of electrical signals mainly for the electrical measurement of a physical quantity, and in particular for control systems such as for example those applicable to controlling nuclear reactors.

For example, one important application of the present invention is as a flux monitor for sensing when the neutron flux within a nuclear reactor exceeds a preset level.

Arrangements for controlling the nuclear reactors include systems which measure the neutron flux in the reactor, e.g. as the current produced in an ionisation chamber, and operate a trip to shutdown the reactor (or reduce the reactor power) when the flux exceeds a preset level (the trip level) and to give a warning when the indicated flux falls by a predetermined margin below this level. Thus, whereas in normal operation the flux level might be a few percent below the trip level, a margin of, say, 20% would be considered excessive, and an alarm known as the "excess margin alarm," would operate. In addition to indicating that the reactor is being operated incorrectly, an important function of the excess margin alarm is to safeguard against failure of the measuring system itself, e.g. open-circuiting of the polarising and signal connections to the ionisation chamber, which would render the upper level trip inoperative.

In one known arrangement, the current from a D.C.-polarised ionisation chamber is compared with a D.C. reference signal which defines the preset trip level, a mechanical chopper being used to convert the difference signal into an A.C. signal for subsequent amplification in an A.C. amplifier. The output of the A.C. amplifier is applied to a phase-sensitive trip circuit comprising a phase-sensitive rectifier and polarised relay under normal operating conditions the relay is held energised, but if the flux rises to such a level that the difference signal becomes zero the amplifier output signal falls to zero and the relay is de-energised. This is the trip operating condition. Further increase of the flux produces an output of reversed phase which maintains the relay contacts even more positively in their de-energised positions. The A.C. amplifier output is also displayed on a meter as a "margin-to-trip" indication, and an excess margin alarm circuit is provided by which a second relay is de-energised if this margin exceeds a given percentage of the trip level. The trip level itself can be changed by varying the D.C. reference signal level.

In the case of zero-energy or research reactors, however, which may run for long periods far below normal full power, it is desirable that the trip level be correspondingly low, so low in fact that the provision of an excess margin alarm becomes impractical; nor, in such cases, is it so important to limit the margin from trip at which the reactor operates. Hence, in research reactor control systems proposed hitherto, no excess margin alarm has been included. In one such system, which employs a D.C. coupled instead of a chopper-type amplifier, a sinusoidal A.C. waveform is superimposed on the D.C. polarising supply to the ionisation chamber for the purpose of monitoring the integrity of the chamber connections and the first stages of the D.C. amplifier.

It is an object of the present invention to provide a versatile system which does not depend on the provision of an excess margin alarm for checking the integrity of the input connections (while permitting such an alarm to be fitted for other reasons if desired), and which allows the use of a chopper-type amplifier, which is inherently safer than the D.C.-coupled type.

It is another object of this invention to provide a substraction circuit for yielding an output representative of the difference between a parameter and a reference level.

In its broadest aspect the invention resides in an amplifying system adapted to compare a D.C. signal with an A.C. signal and to amplify the difference between the signals to produce an output signal wherein the D.C. signal is compared with a portion of the A.C. signal by means of a modulator operated in synchronism with the A.C. signal.

According to a further aspect of the present invention a system for electrical measurement of a physical quantity comprises a transducer yielding a D.C. output dependent on the physical quantity being measured, an A.C. generator for superimposing on said D.C. output, via said transducer, an A.C. reference signal, an input modulator synchronised with said A.C. generator for deriving a mean A.C. signal proportional to the difference between the amplitude of said D.C. output and the amplitude of a portion of the A.C. reference signal, an A.C. amplifier for amplifying the said mean A.C. signal, an output demodulator synchronised with said A.C. generator for demodulating the output of the A.C. amplifier and polarity-sensitive trip means controllable by said demodulated output.

Preferably the superimposed A.C. reference signal is square or rectangular, and preferably the signal applied to the input modulator has a waveform such that failure of the input modulator to modulate produces a demodulated output of such polarity as to operate the trip means.

The transducer may be an ionisation chamber, and the A.C. reference signal may be superimposed on the output current therefrom by superimposing an A.C. voltage waveform on the D.C. polarising voltage of the chamber.

The input modulator may be a transistor chopper. The signal applied thereto may include a large-amplitude portion which is normally short-circuited by the input chopper, but on failure of the chopper provides an input to the A.C. amplifier which after demodulation provides an output to operate the trip means.

The trip means may comprise a polarised relay.

To enable the nature of the present invention to be more readily understood, attention is directed by way of example to the accompanying drawings wherein, FIG. 1 is a schematic circuit diagram of a reactor control system based on neutron flux measurement embodying the present invention;

FIG. 2 shows waveforms in the circuit of FIG. 1;

FIG. 3 is a diagram of a modification of the system of FIG. 1 based on reactor temperature measurement.

Referring to FIGS. 1 and 2, there is shown a gauge, shown in FIG. 1 as an ion chamber 1, polarised by a +600 v. D.C. supply 2, thereby presenting a source of a unidirectional signal representative of a parameter monitored by the gauge, on which is superimposed an A.C. waveform. The latter waveform, which is triangular in shape, is generated in an integrator 4 supplied from a pulse generating square wave source, oscillator 3, which generates a rectangular reference waveform of the form shown at A in FIG. 2 representative of the reference level having a mark/space ratio ($a/b$ in waveform A) of 3:1. The triangular waveform which results from integration in 4 is shown at B and the total voltage, that is, the composite signal applied to the ion chamber at C in FIG. 2.

In the absence of any ionisation current in the chamber due to radiation flux, the output current from the chamber results solely from the differentiation of the waveform B by the inter-electrode capacity of the chamber, and is of the form shown at D, which includes typical current values. When ionisation current due to radiation flux flows in the chamber, waveform D is superimposed on this current as shown at E in FIG. 2, where an ionisation current of 98 μa. is assumed to be flowing.

The waveform E is applied to the emitter of a p-n-p transistor 5 operating as a chopper modulator, whose base is driven by a waveform F derived from the oscillator 3. The transistor 5 acts as a switch means actuated from the square wave signal source for passing the composite signal to the amplifier only for those periods when the amplitude of the composite signal is at a difference denoting level. It will be seen that the latter is a square wave synchronised with the waveform A but running at twice the frequency so that it has a mark/space ratio of 1:1, and that it is phased so that the chopper short-circuits the waveform E during the "space" portion, $b$.

The circuit is arranged to trip at that value of ionisation current which causes the level of the "mark" portion $a$ of waveform E to coincide with zero, i.e. in the present example the trip value is 100 μa. Waveform E therefore results from a flux level just below the trip value, and an increase in ionisation current of 2 μa. would bring the "mark" portion of the waveform to zero.

The output from the chopper is shown at G, a square wave having a peak-to-peak amplitude equal to the amplitude of the "mark" portion of waveform E. An amplifier 6 is provided to receive the composite signal from the chopper 5.

The A.C. component of waveform G is passed to the A.C. amplifier 6 followed by a chopper demodulator constituted by the p-n-p transistor 8. The base of this transistor is driven from the oscillator 3 by a rectangular waveform shown at H which has the same mark/space ratio as waveform A and is phased to short-circuit the amplifier output in synchronism with the short-circuiting action of the input chopper 5 but during alternate pulses to these in which the "space" $b$ occurs in the reference waveform A. The resultant demodulated output waveform K is a negative-going square-wave whose mean D.C. level is applied to keep a polarised relay 9 energised. In the trip condition waveform G reduces to a straight line substantially coincident with zero, and there is no input to the A.C. amplifier; hence there is no output waveform K and the polarised relay 9 is de-energised.

If for any reason the input chopper 5 ceases to operate, owing for example to an open-circuit in its base connection, the entire A.C. component of the chamber current, including portion $b$, will be fed to the input of the amplifier, whose output will thus be of the same form as waveform A. Demodulation of this waveform by the transistor 8 results in the waveform L whose mean D.C. level is positive and hence inoperative to energise the polarised relay. The circuit is therefore "fail-safe" in this respect.

Increase of input current beyond the trip value results in a phase reversal of the input waveform G, which after amplification and demodulation produces an output waveform in antiphase to K and again having a mean positive D.C. level inoperative to energise the polarised relay.

In FIG. 3 the ionisation chamber 1 of FIG. 1 is replaced by a thermocouple 13. One lead of the thermocouple 13 is connected to the emitter of the chopper transistor 5', the other to earth via a resistor R1. Because the thermocouple presents a resistance instead of a capacitance impedance, the waveform applied to it is not differentiated and hence the integrator 4 can be omitted. Instead the rectangular waveform is fed directly from the oscillator 3' to the unearthed end of R1 via a resistor R2 whose value is made large compared with the resistance of the thermocouple so that the amplitude of the A.C. reference signal is not significantly affected by changes of thermocouple resistance with temperature. The result is to superimpose on the D.C. voltage output of the thermocouple 13, a rectangular voltage waveform similar to that shown in FIG. 2D.

An excess alarm may be arranged (FIG. 1) by comparing a second A.C. reference signal with the normal amplified A.C. input signal (i.e. with the amplified A.C. component of waveform G) taken from a separate output of the amplifier 6. This second A.C. reference signal, derived from 3 through resistor R, having the same waveform and phase relative to waveform G as waveform F and being in antiphase, the two signals subtract. In normal operation this second reference signal is the larger of the two so that the phase of the output signal from amplifier 10 after demoulation by transistor 11 causes the excess margin polarised relay 12 to be operated. As the flux falls, the amplified A.C. input signal increases, until at a preset amplitude of the second A.C. reference signal, corresponding to the excess margin value, it exceeds the latter, reverses the phase of the amplifier output and so causes the polarised relay to be de-energised.

Whilst the invention has been described above in relation to nuclear reactor control systems, it is applicable to any system involving the comparison of A.C. and D.C. signals, such system, according to this broader aspect, comprising amplifying apparatus adapted to compare a D.C. signal with an A.C. signal and to amplify the difference between the signals to produce an output signal, wherein the D.C. signal is compared with a portion of the A.C. signal by means of a modulator operated in synchronism with the A.C. signal.

We claim:
1. An amplifying system for electrical measurement of a physical quantity comprising a transducer yielding a D.C. output dependent on the physical quantity being measured, an A.C. generator for imposing upon said D.C. output, via said transducer, an A.C. reference signal, an input modulator synchronized with said A.C. generator for deriving a mean A.C. signal proportional to the difference between the amplitude of said D.C. output and the amplitude of a portion of the A.C. reference signal, an A.C. amplifier for amplifying the said mean A.C. signal, an output of modulator synchronised with said A.C. generator for demodulating the output of the A.C. amplifier and polarity-sensitive trip means controllable by said demodulated output.

2. A system as claimed in claim 1 including a means for ensuring that the signal applied to the input modulator is of a form such that failure of the input modulator to modulate produces a demodulator output of such form as to operate said polarity sensitive trip means.

3. A system for electrical measurement as claimed in claim 1 including an ionisation chamber, a D.C. polarising supply for the chamber, the chamber yielding a D.C. output, a source of locally generated first and second A.C. signal means for imposing upon the D.C. polarising supply a first locally generated A.C. signal, an input modulator synchronised with said first A.C. signal for deriving a mean A.C. signal proportional to the difference between the amplitude of said D.C. output and the amplitude of a portion of the said second A.C. reference signal, an A.C. amplifier for amplifying said mean A.C. signal, and an output demodulator synchronised with said A.C. signal generator for demodulating the output of the A.C. amplifier.

A system for electrical measurement of ionising radiations comprising an ionisation chamber, a D.C. polarising supply for the chamber, the chamber yielding a D.C. output, a source of locally generated first and second A.C. signals, a connection for applying a first A.C. signal to the polarising electrode of the chamber, and input chopper modulator synchronised with said first A.C.

signal for deriving a mean A.C. signal proportional to the difference between the amplitude of the D.C. output and the amplitude of a portion of said second A.C. signal, an A.C. amplifier for amplifying said mean A.C. signal and an output demodulator synchronised with said second A.C. signal for demodulating the output of the A.C. amplifier.

5. A flux monitor for sensing when the neutron flux within a nuclear reactor exceeds a preset reference comprising a flux gauge for yielding a D.C. signal denoting the level of flux, said gauge being of a kind that can be modulated with an alternating current by an alternating voltage applied to the gauge in order to check on the electrical connections to the gauge, a means for applying to the gauge an alternating voltage to modulate said D.C. signal with an alternating current whose peak amplitude corresponds to a preset reference, a chopper amplifier comprising an input modulator, an alternating current amplifier and an output demodulator and means for applying demodulating pulses to the demodulator during an interval of time within that time when the alternating current subtracts from the D.C. signal and for applying modulating pulses to the modulator simultaneously with the application of the demodulation pulses and also when the alternating current reinforces the D.C. signal so that the modulator only passes a signal representing the difference between the D.C. signal and the reference, the signal having a marker superimposed thereon to act as a datum for the demodulator.

6. A monitor according to claim 5 wherein the first mentioned means yields an alternating current in the form of square wave pulses having a mark-space ratio of 3:1, and the second mentioned means yields demodulating pulses which are also square wave pulses having the same mark-space ratio and pulse repetition frequency and modulating pulses which are square wave pulses having a mark-space ratio of 1:1 and twice said pulse repetition frequency.

7. A monitor according to claim 5 further arranged for sensing when the flux differs by more than a preset margin from the reference, wherein there is provided a means for comparing the signal within the alternating current amplifier with a further pulsed reference signal.

8. A monitor according to claim 5 wherein said gauge is an ionization chamber.

9. A monitor according to claim 5 wherein said gauge is a thermocouple.

References Cited
UNITED STATES PATENTS

| | | | |
|---|---|---|---|
| 2,951,187 | 8/1960 | McGrath | 325—118 X |
| 3,065,348 | 11/1962 | Cockbaine et al. | 250—83.6 |

RALPH G. NILSON, *Primary Examiner.*

ARCHIE R. BORCHELT, *Examiner.*

S. ELBAUM, *Assistant Examiner.*